United States Patent
Logvinov et al.

(10) Patent No.: US 7,106,177 B2
(45) Date of Patent: Sep. 12, 2006

(54) METHOD AND SYSTEM FOR MODIFYING MODULATION OF POWER LINE COMMUNICATIONS SIGNALS FOR MAXIMIZING DATA THROUGHPUT RATE

(75) Inventors: Oleg Logvinov, East Brunswick, NJ (US); Brion Ebert, Easton, PA (US)

(73) Assignee: Arkados, Inc., North Plainfield, NJ (US)

( * ) Notice: Subject to any disclaimer, the term of this patent is extended or adjusted under 35 U.S.C. 154(b) by 0 days.

(21) Appl. No.: 10/645,237

(22) Filed: Aug. 21, 2003

(65) Prior Publication Data

US 2004/0161041 A1    Aug. 19, 2004

Related U.S. Application Data

(60) Provisional application No. 60/404,882, filed on Aug. 21, 2002.

(51) Int. Cl.
*H04M 11/04* (2006.01)

(52) U.S. Cl. .............................. 340/310.02; 340/310.01; 340/310.06; 370/203; 375/260

(58) Field of Classification Search ............ 340/310.01, 340/310.02, 310.06, 310.08; 714/792, 784; 370/203; 375/260, 261, 269, 227, 232, 239, 375/348, 130, 225; 455/222, 337, 226.3
See application file for complete search history.

(56) References Cited

U.S. PATENT DOCUMENTS

| | | | | |
|---|---|---|---|---|
| 6,108,374 A | * | 8/2000 | Balachandran et al. | 375/227 |
| 6,397,368 B1 | | 5/2002 | Yonge, III et al. | 714/790 |
| 6,760,373 B1 | * | 7/2004 | Gross et al. | 375/232 |
| 6,836,515 B1 | * | 12/2004 | Kay et al. | 375/260 |
| 2002/0039388 A1 | * | 4/2002 | Smart et al. | 375/260 |
| 2003/0043928 A1 | | 3/2003 | Ling et al. | 375/267 |
| 2003/0076790 A1 | | 4/2003 | Hiramatsu et al. | 370/318 |
| 2003/0124983 A1 | | 7/2003 | Parssinen et al. | 455/69 |
| 2003/0235254 A1 | * | 12/2003 | Fanson et al. | 375/260 |
| 2004/0095904 A1 | | 5/2004 | Laroia et al. | 370/329 |
| 2005/0018784 A1 | * | 1/2005 | Kurobe et al. | 375/260 |
| 2005/0063482 A1 | * | 3/2005 | Tzannes | 375/260 |

* cited by examiner

*Primary Examiner*—Brent A. Swarthout

(57) ABSTRACT

Data throughput rate in a power line communications ("PLC") system is controlled by generating PLC carrier signals in accordance with a PLC signal frame structure containing payload symbols where orders of modulation are selected for the individual PLC carriers based on evaluation of at least one of a PLC system channel quality and node configuration data. The selected orders of modulation determine the processing operations that a source PLC transceiver performs for generating PLC signals or that a destination PLC transceiver performs for extracting information content from received PLC signals. The orders of modulation can be selected to maximize the data throughput rate while maintaining compatibility with prior art PLC system protocols and standards that require a PLC signal frame structure and its payload portion to have fixed, predetermined lengths.

31 Claims, 6 Drawing Sheets

METHOD AND SYSTEM FOR MODIFYING MODULATION OF POWER LINE COMMUNICATIONS SIGNALS FOR MAXIMIZING DATA THROUGHPUT RATE

CROSS REFERENCE TO RELATED APPLICATION

This application claims the benefit of U.S. Provisional Application No. 60/404,882 filed Aug. 21,2002, which is incorporated by reference herein.

FIELD OF THE INVENTION

This invention relates to the field of communications over conventional electric power conveying media, and more particularly, to improving data throughput rate in a power line communications ("PLC") system by individually selecting an order of modulation for each PLC carrier available for PLC data signal transmission.

BACKGROUND OF THE INVENTION

In a PLC system, information is conveyed over conventional, power line media on PLC data signals. The PLC system includes PLC transceivers that operate in accordance with predetermined PLC protocols and standards. The protocols and standards are formulated in view of the processing capabilities of the PLC transceiver equipment and the expected PLC signal transmission characteristics of the PLC system. The protocols and standards, for example, define the spectrum of frequencies used for PLC signal transmissions and how information content and associated overhead (control) data are carried on PLC signals. The arrangement of information content and overhead data within a PLC signal is typically referred to as a frame structure. The frame structure establishes the sequence in which PLC signals containing overhead and information content data are generated for transmission over the PLC system.

When many of the prior art PLC systems, such as orthogonal frequency division multiplexing ("OFDM") PLC systems, were designed, the lack or limited availability of high speed processing technology dictated the format of PLC signals and, thus, the PLC signal processing operations performed at the prior art PLC transceivers. In addition, prior art PLC system design focused on robustness, or ensuring that a destination PLC transceiver accurately and completely reproduces information content that a source PLC transceiver transmits on a PLC signal over a PLC system. Thus, the desire for robustness, the available processing technology and also expected PLC signal transmission characteristics of the PLC system determined the design parameters of the prior art PLC signal frame structure.

The currently and widely used PLC signal frame structure, which is substantially the same as the frame structure adopted in early prior art PLC systems, includes a payload portion interposed between start and end delimiters. See Gardner, S. et al., *"HomePlug Standard Bring Networking to the Home"*, http://www.commsdesign.com/main/2001/12/0012feat5.htm, Dec. 12, 2000, incorporated by reference herein. The start and end delimiters include communications overhead data, such as a preamble, destination address, source address, network protocol type and frame check (error correction), which a destination PLC transceiver requires for extracting information content and other processing control data from the PLC signals transmitted by a source PLC transceiver. The payload portion contains a plurality of payload symbols. Each of the payload symbols corresponds to one or more distinct information content data modulated PLC carriers that are to be generated at and transmitted from the PLC transceiver. The PLC carriers that can be modulated with information content are at frequencies distributed across a predetermined PLC frequency spectrum.

The prior art PLC system design also provided that very few modulation methods can be used to modulate a PLC carrier and that all of the PLC carriers that can be generated for a payload symbol are modulated using the same predetermined modulation method ("order of modulation"). The prior art PLC system design preferred the use of a single order of modulation for all PLC carriers because this simplified the overall system design, especially concerning design of the modulator, demodulator, interleaver, deinterleaver, error correction algorithms, etc. This design approach permitted the complexity level of the system to be commensurate with the capabilities of the then existing design techniques, silicon geometries and design densities. In operation, the prior art PLC transceiver attempts to select the highest order of modulation for the PLC carriers, in view of channel quality data indicating expected PLC signal transmission performance, to obtain the most data bits per available PLC carrier within a predetermined PLC frequency spectrum, thereby maximizing data throughput rate.

Although the prior art PLC system design does not provide that the order of modulation of an individual PLC carrier can be dynamically changed in view of channel quality data particular to an individual PLC carrier, this result was tolerated or required in view of the processing speed limitations of technologies available in the prior art and to ensure reliable and accurate transfer of information content using PLC signals.

Since the development of the prior art PLC frame structure design, which continues to be used in a vast majority of current PLC systems, advanced, higher speed silicon implementations have become available and cost effective for use in a PLC transceiver. PLC systems and PLC transceivers, however, continue to utilize the prior art PLC system frame structure design. In many circumstances, this continued prior art requirement that all PLC carriers that can be generated for a payload symbol are modulated at a single order of modulation unnecessarily limits the maximum available data throughput rate for the PLC system.

Therefore, a need exists for a system and method for maximizing data throughput rate in a PLC system in view of available higher speed data processing technologies and while also permitting that existing PLC transceivers can continue to be used without difficult or costly modifications.

SUMMARY OF THE INVENTION

In accordance with the present invention, the data throughput rate associated with PLC signal transmission in a PLC system is maximized by selectively controlling the order of modulation of distinct PLC carriers, which have frequencies distributed across a predetermined PLC frequency spectrum or frequencies grouped within sub-bands of the predetermined PLC spectrum, and which can be generated in accordance with a symbol structure of a PLC signal frame transmission. The order of modulation for a distinct available PLC carrier is determined based on PLC system signal transmission performance channel quality data obtained in real time, based on non-real time processing configuration data ("node configuration data") obtained from PLC signals transmitted over the PLC system to, or pre-programmed at, PLC transceiver equipment or based on a combination of the channel quality data and the node configuration data. In preferred embodiments, node configuration data can be determined from at least one of the following data types: real time analysis data; historical analysis data; channel tracking data generated based on movement ("drift") of the channel quality; channel prediction data generated based on the repetitive patterns ("learned") of the channel behavior that may be associated with, for example, 60 Hz currents.

In a preferred embodiment of the present invention, an order of modulation for an available PLC carrier for a symbol is selected to maximize data throughput rate in a PLC system. The order of modulation selected for each distinct PLC carrier is determined by comparing PLC transmission quality estimates for the distinct PLC carriers with PLC system quality thresholds. The transmission quality estimates are determined based on evaluation of channel quality and node configuration data. The PLC thresholds, which are determined based on evaluation of channel quality and node configuration data and also based on specific features of the PLC transceiver implementation, such as analog front end resolution, clock accuracy, etc., that are typically considered in determining a maximum error free modulation density, i.e., an acceptable error rate, are representative of how many data bits can be packed onto any PLC carrier without causing demodulation accuracy to exceed the maximum error free density level. Based on the results of the comparison, a different order of modulation can be applied to each PLC carrier available to be generated for a symbol. Advantageously, the ability to select higher orders of modulation for individual PLC carriers permits that the individual PLC carriers can carry more data bits than otherwise can be carried by the individual PLC carriers generated for a symbol based on prior art PLC system design requirement.

BRIEF DESCRIPTION OF THE DRAWINGS

Other objects and advantages of the present invention will be apparent from the following detailed description of the presently preferred embodiments, which description should be considered in conjunction with the accompanying drawings in which.

DETAILED DESCRIPTION OF THE INVENTION

The present invention of selectively controlling the order of modulation for individual PLC carriers, which have frequencies within a predetermined PLC frequency spectrum and can be generated in accordance with a payload symbol of a PLC signal frame structure, is explained in connection with operations performed at an OFDM PLC system which is designed for conveying PLC signals over conventional utility electrical power media which can be contained within or outside a premises, such as an office building or residential home. It is to be understood, however, that the present invention can be applied to OFDM based or other communication systems operating on other types of wired or wireless media, and that the PLC carriers whose modulation is selectively controlled in accordance with the present invention also can carry control signals as well as information content.

Figure 1:
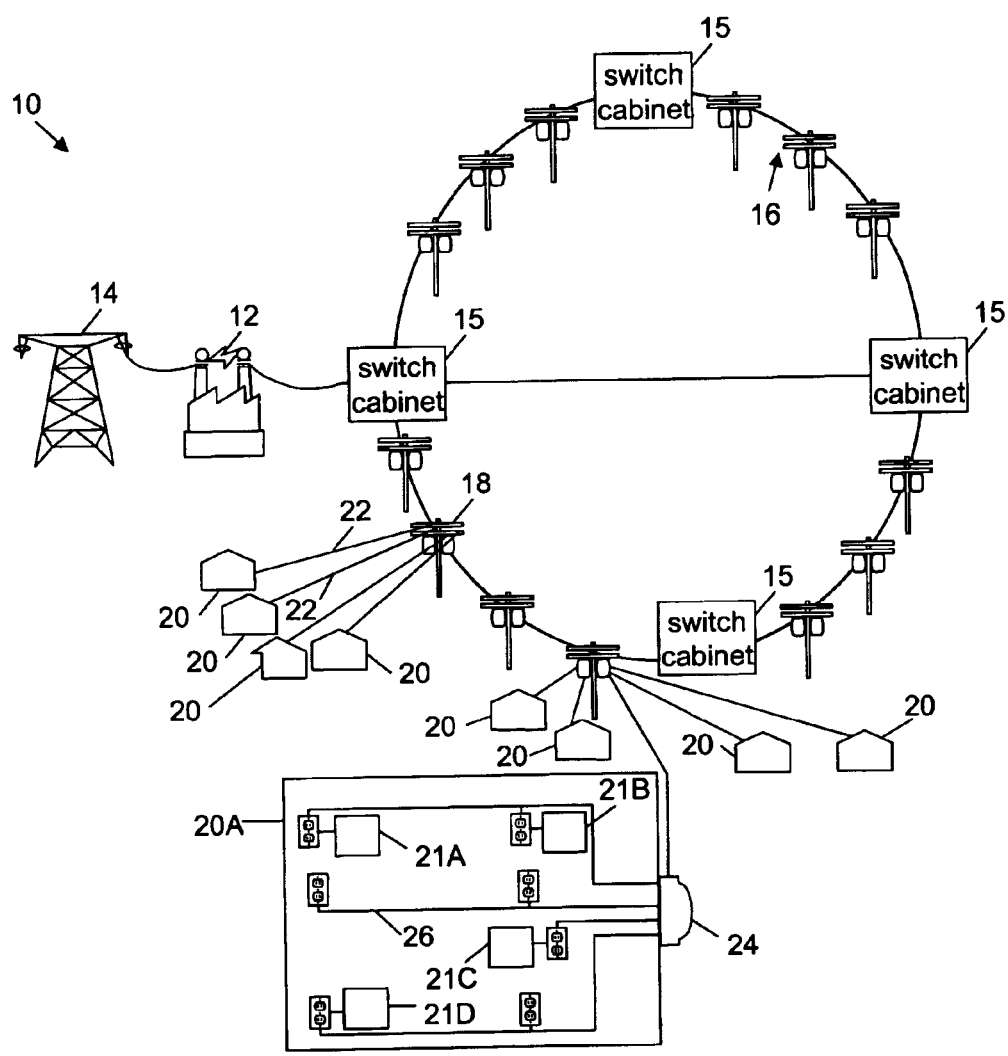
FIG. 1 is an exemplary power line distribution network for high speed data communications.

FIG. 1 illustrates an exemplary electric power distribution and high speed data communications system 10, which includes both utility electric power distribution and in premise power distribution capabilities and over which PLC data signals generated in accordance with the present invention can be conveyed. Referring to FIG. 1, the system 10 includes a standard medium power substation 12 coupling a high voltage power line 14 to a common medium voltage power line and data distribution access network 16 via a switch cabinet 15. The network 16 is typically configured in a loop, several miles in length, and positioned in proximity to low voltage access points 20, which can be homes, businesses or other entities. Step down transformers 18 couple the network 16 to low voltage access lines 22, which are at 110–240 V AC and extend to the respective low voltage access points 20. Thus, the network 16 forms a wide area data network ("WAN") for data communications and supplies electricity to the low voltage access points 20. It is to be understood that the network 16 can include power and communications distribution network elements located above as well as below ground. Electric power meters 24 couple respective ends of the low voltage lines 22 to conventional in-home or in-building electricity distribution networks 26, which are contained within the low voltage access points 20. As well known in the art, electronic appliances 21 are coupled to the network 26 within an access point 20, such as the access point 20A, where each of the appliances 21 can include a PLC transceiver (not shown) having PLC data signal processing capabilities. The electronic appliances 21 in the network 26, thus, can be connected to one another to form a local access network ("LAN") for data communications within a home, business or other environment. Also as well known in the art, PLC data signals can be used to transmit high speed data across all segments of the network 10.

In accordance with the present invention, a PLC transceiver, which provides for transmission of PLC data signals between PLC transceiver devices in a PLC system, selects an order of modulation for individual available PLC carriers that can be generated for a symbol of a PLC frame structure, based on the results of an evaluation of PLC system channel quality data, processing configuration data ("node configuration data") obtained from PLC signals transmitted over the PLC system to, or pre-programmed at, the PLC transceiver, or a combination of the channel quality data and the node configuration data, to maximize data throughput rate and, therefore, increase the efficiency of utilization of the PLC system as a channel for transferring communications data. Referring to FIG. 1, the inventive PLC transceiver can be installed in all segments of the PLC system 10 where a higher data throughput rate is desired. For example, each of a first electronic appliance coupled to the network 26 within a first access point 20 and a second electronic appliance coupled to the electric distribution network 26 within a second access point 20 can contain the inventive PLC transceiver for maximizing the data throughput rate for PLC signal transmission between the first and second access points 20 and 20. Also for example, in the PLC system 10, each of the electronic appliance 21A and the electronic appliance 21D is coupled at a different point to the network 26 within the access point 20A and can contain the inventive PLC transceiver for maximizing the data throughput rate for PLC signal transmission between the two coupled points of the network 26.

Figure 2:
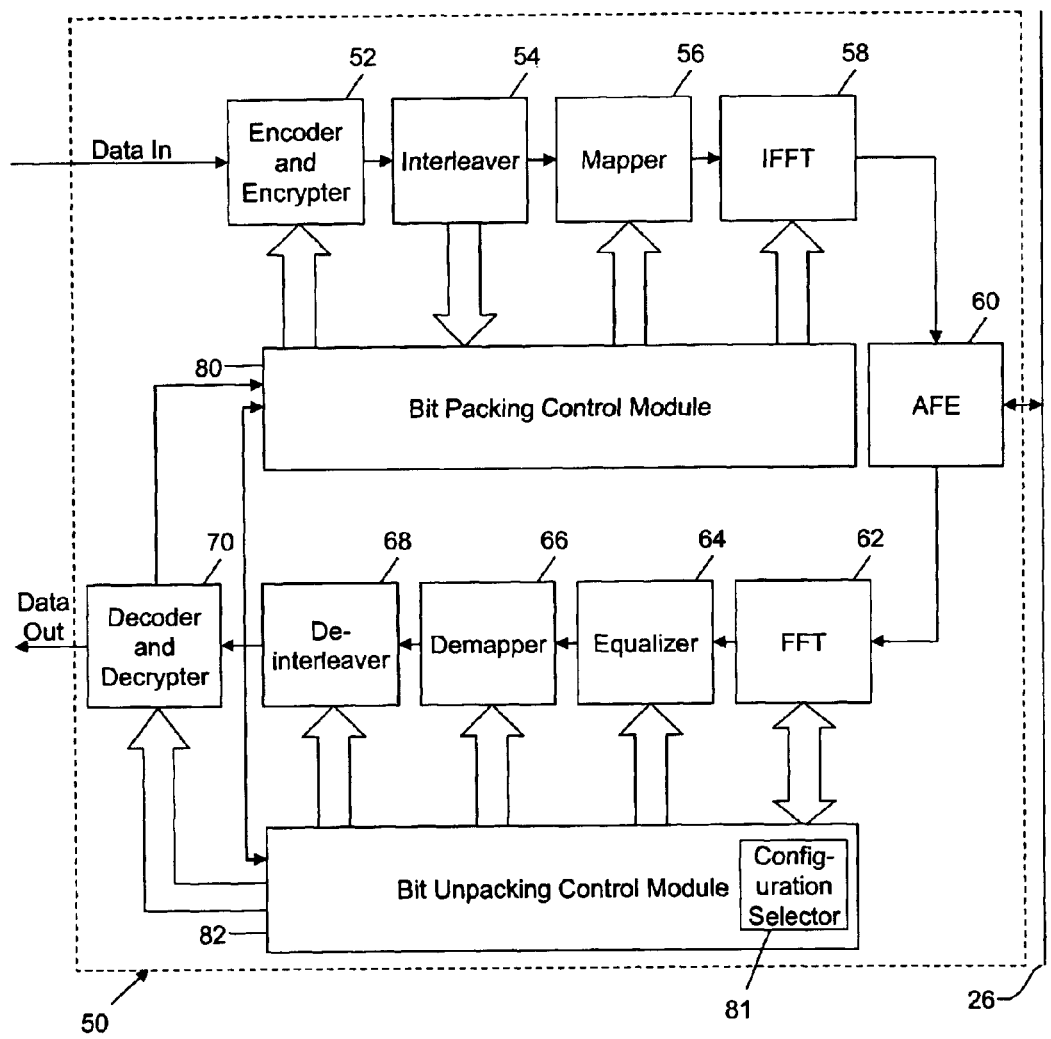
FIG. 2 is a block diagram of a preferred OFDM PLC transceiver in accordance with the present invention.

FIG. 2 is a preferred embodiment of an OFDM PLC transceiver 50 that establishes the physical connection and electronic signal link between the power line network 26 in an access point 20 and a data input/output ("I/O") device, such as a computer (not shown), as well known in the art, and furthermore controls the orders of modulation selected for individual PLC carriers to be generated for symbols included in a PLC signal frame structure in accordance with the present invention. The inventive PLC transceiver 50 is described below as containing modules, which perform PLC signal processing using techniques well known in the prior art, and which are modified in accordance with the present invention to perform PLC signal processing where individual PLC carriers can be modulated at one or more selected frequencies, thereby varying the number of data bits carried by the individual PLC carriers generated for a symbol. See, for example, U.S. patent application Ser. No. 10/211,033, filed Aug. 2, 2002 and U.S. patent application Ser. No. 10/309,567, filed Dec. 4, 2002, each of which is assigned to the assignee of this application and incorporated by reference herein, for a description of conventional PLC transceiver construction and operation. It is to be understood that the modules of the PLC transceiver 50 described below as performing data or signal processing operations constitute a software module, a hardware module or a combined hardware/software module. In addition, each of the modules suitably contains a memory storage area, such as RAM, for storage of data and instructions for performing processing operations in accordance with the present invention. Alternatively, instructions for performing processing operations can be stored in hardware in one or more of the modules. The modules can be combined into a single integral module, or a plurality of composite modules, using techniques well known in the art Referring to FIG. 2, the PLC transceiver 50 includes a data forward error correction ("FEC") encoder and encrypter 52, a bit interleaver module 54, a mapper module 56, an inverse fast fourier ("IFFT") processor module 58 and an analog front end ("AFE") 60 connected to one another in the recited sequence. The PLC transceiver 50 further includes a FFT processor module 62, an equalizer module 64, a demapper module 66, a deinterleaver module 68 and a FEC decoder and decrypter module 70 connected to one another in the recited sequence. The AFE 60 is also coupled to the FFT module 62.

The modules 52, 54, 56, 58, 60, 62, 64, 66, 68 and 70 are well known prior art PLC transceiver components that can perform prior art PLC signal processing operations which are well known in the art. It is important to note that, in the prior art, the PLC signal processing modules in the PLC transceiver cannot be reprogrammed to process individual PLC carriers modulated at selected orders of modulation, where the selected orders of modulation are not the same for all of the individual PLC carriers. In other words, the prior art modules can only perform PLC signal processing operations where individual PLC carriers for a symbol are generated using the same order of modulation.

In accordance with the present invention, the PLC transceiver 50 further includes a bit packing control module 80 containing a configuration selector module 81. The module 80 is coupled to each of the modules 52, 54, 56 and 58 and to a bit unpacking control module 82, which is coupled to each of the modules 62, 64, 66, 68 and 70. Furthermore, each of the modules 52, 56 and 58 and also each of the modules 62, 64, 66, 68 and 70 is reprogrammable and modifies its processing operations based on control modulation configuration parameter signals, which identify orders of modulation of respective individual PLC carriers for a symbol, and which are suitably supplied from the packing module 80 or the unpacking module 82 of the inventive PLC transceiver 50.

As discussed in further detail below, the packing module 80 at a source PLC transceiver generates and transmits to the modules 52, 56 and 58 control modulation configuration parameter signals based on the orders of modulation selected for individual PLC carriers to be generated for a symbol. The control signals modify the processing operations that the modules 52, 56 and 58 perform for generating individual, PLC carriers modulated at selected orders of modulation. Each of the selected orders of modulation corresponds to the number of data bits that an individual PLC carrier generated for a symbol, such as a payload symbol, can carry. The number of data bits ("bit packing level") is determined based on evaluation of channel quality data concerning the individual PLC carrier and node configuration data stored at the unpacking module 80 contained in a PLC transceiver which is the destination of a PLC signal transmission from the source PLC transceiver.

The unpacking module 82 at the destination PLC transceiver generates and transmits to each of the modules 64, 66, 68 and 70 control modulation configuration parameter signals that are based on the selected orders of modulation of the received PLC carriers. The control signals modify the processing operations that the modules 64, 66, 68 and 70 perform for extracting information content and other data that the individual PLC carriers modulated in accordance with the selected orders of modulation carry.

Figure 3:
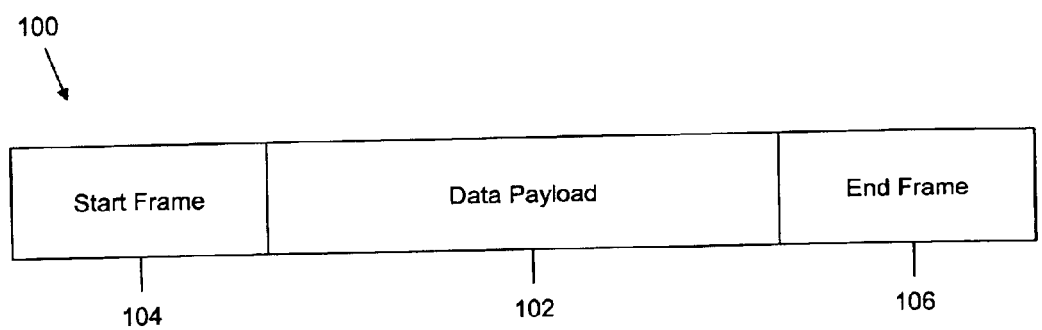
FIG. 3 is an exemplary PLC system frame structure used for transmitting data in an OFDM PLC system.

For purpose of highlighting the inventive features, it is assumed that each of the modules 52, 56, 58, 62, 64, 66, 68 and 70 normally operates in a default legacy PLC mode. In the legacy mode, PLC signal processing operations are performed in accordance with a legacy PLC signal frame structure 100 as shown in FIG. 3. Referring to FIG. 3, the frame structure 100 includes a payload portion 102, which primarily contains information content, interposed between a start delimiter 104 and an end delimiter 106, both of which contain overhead data. The legacy design requires the following: (i) each of the frame structure 100 and the payload portion 102 has a fixed, predetermined length; (ii) each of the payload symbols contained in the payload portion 102 has a fixed, predetermined length; (iii) a predetermined number of available PLC carriers, distributed across a predetermined PLC frequency spectrum, can be generated for each payload symbol; and (iv) the order of modulation for each of the individual PLC carriers, i.e., the modulating signal used to modulate the data bits onto the PLC carrier, generated for a payload symbol, is the same. As well known in the art, the order of modulation for a PLC carrier determines the number of data bits ("bit packing level") with which the individual PLC carrier can be modulated. As explained below, the control signals supplied by the packing module 80 modify the processing operations performed at the modules 52, 56 and 58 to provide that the individual PLC carriers can have different selected orders of modulation, where the orders of modulation are selected based on the channel quality data for the respective PLC carriers and the node configuration data. In addition, the control signals supplied by the unpacking module 82 modify the processing operations performed at the modules 62, 64, 66, 68 and 70 to provide that received PLC signals are processed in accordance with their respective orders of modulation, where overhead data extracted from the received PLC signals includes information representative of the orders of modulation for the respective individual PLC carriers.

The operation of the PLC transceiver 50 is illustrated below with reference to the transmission of PLC signals from a source PLC transceiver 50A (not shown) to a destination PLC transceiver 50D (not shown) in the PLC system 10, where the transceivers 50A, 50D in a default mode operate in accordance with legacy PLC system design requirements. Referring to FIG. 1, the transceiver 50A is contained in the electronic appliance 21A that is coupled to the network 26 in the access point 20A and the transceiver 50D is contained in the electronic appliance 21D that is coupled to a different point of the network 26 in the access point 20A than the transceiver 50A. For ease of reference, the modules within the respective transceivers 50A and 50D are referred to below using corresponding alphabetical suffixes, e.g., the transceiver 50A includes the mapper module 56A.

Figure 4:
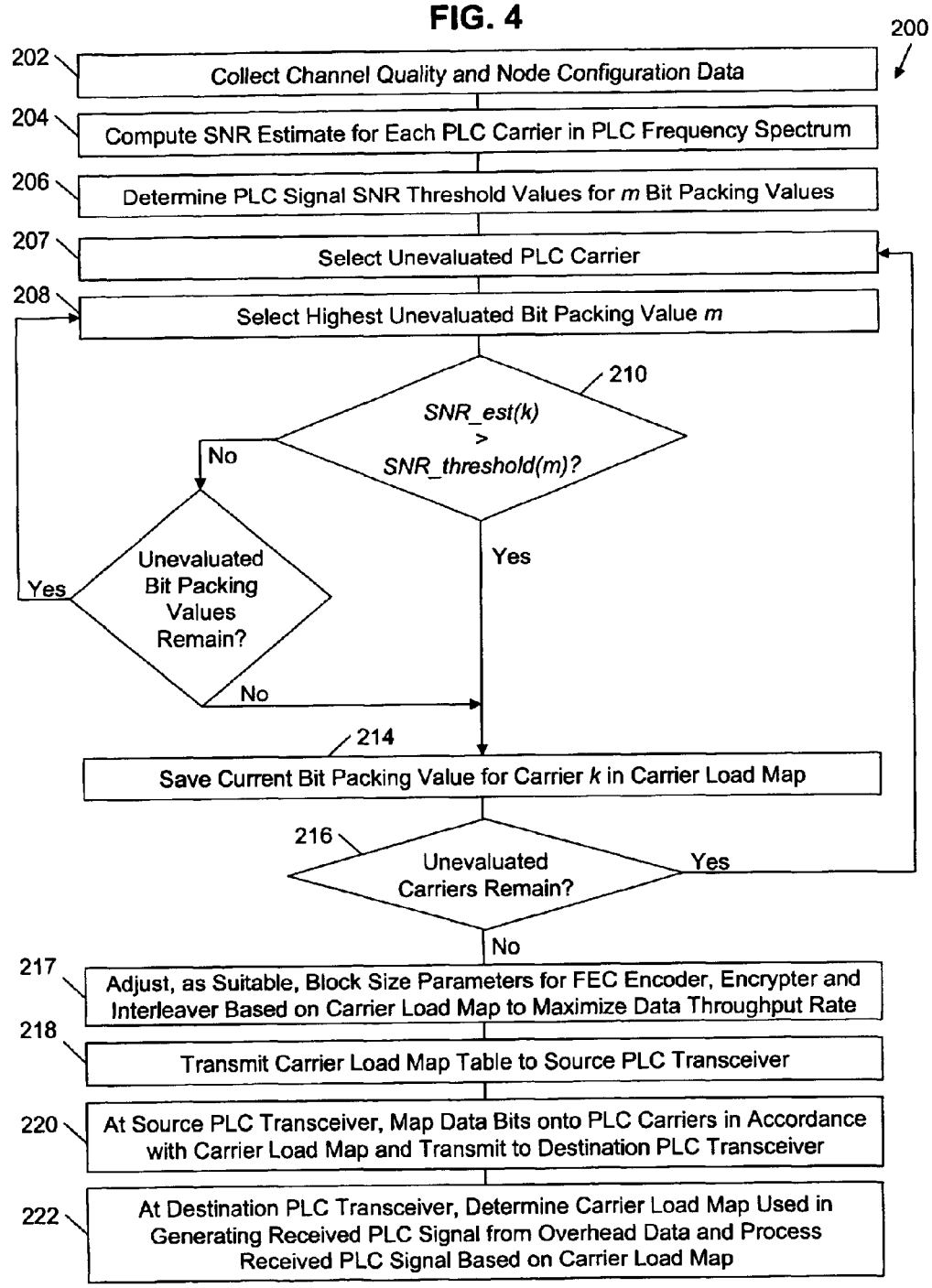
FIG. 4 is a flow diagram of a process for selecting an order of modulation for individual PLC carriers in accordance with the present invention.

FIG. 4 shows an exemplary preferred process 200 that the source and destination PLC transceivers 50A, 50D perform for generating PLC carriers having selected orders of modulation determined based upon PLC system channel quality data and node configuration data. Based on the channel quality and the node configuration data, the packing module 80A applies selected orders of modulation to individual legacy PLC carriers that can be generated for a payload symbol. The capability to select various orders of modulation for individual PLC carriers provides that the data throughput rate and channel utilization efficiency can be maximized, because the same number of legacy PLC carriers, which can be generated for a legacy payload symbol, can be used to carry an amount of data that is greater than that possible in the legacy PLC frame structure. First, higher orders of modulation than those permitted by the legacy frame structure can be selected for an individual PLC carrier. Further, selected, different orders of modulation can be applied to respective individual legacy PLC carriers, whereas a single order of modulation must be applied to all individual PLC carriers for a payload symbol of the legacy PLC frame structure.

Figure 5:
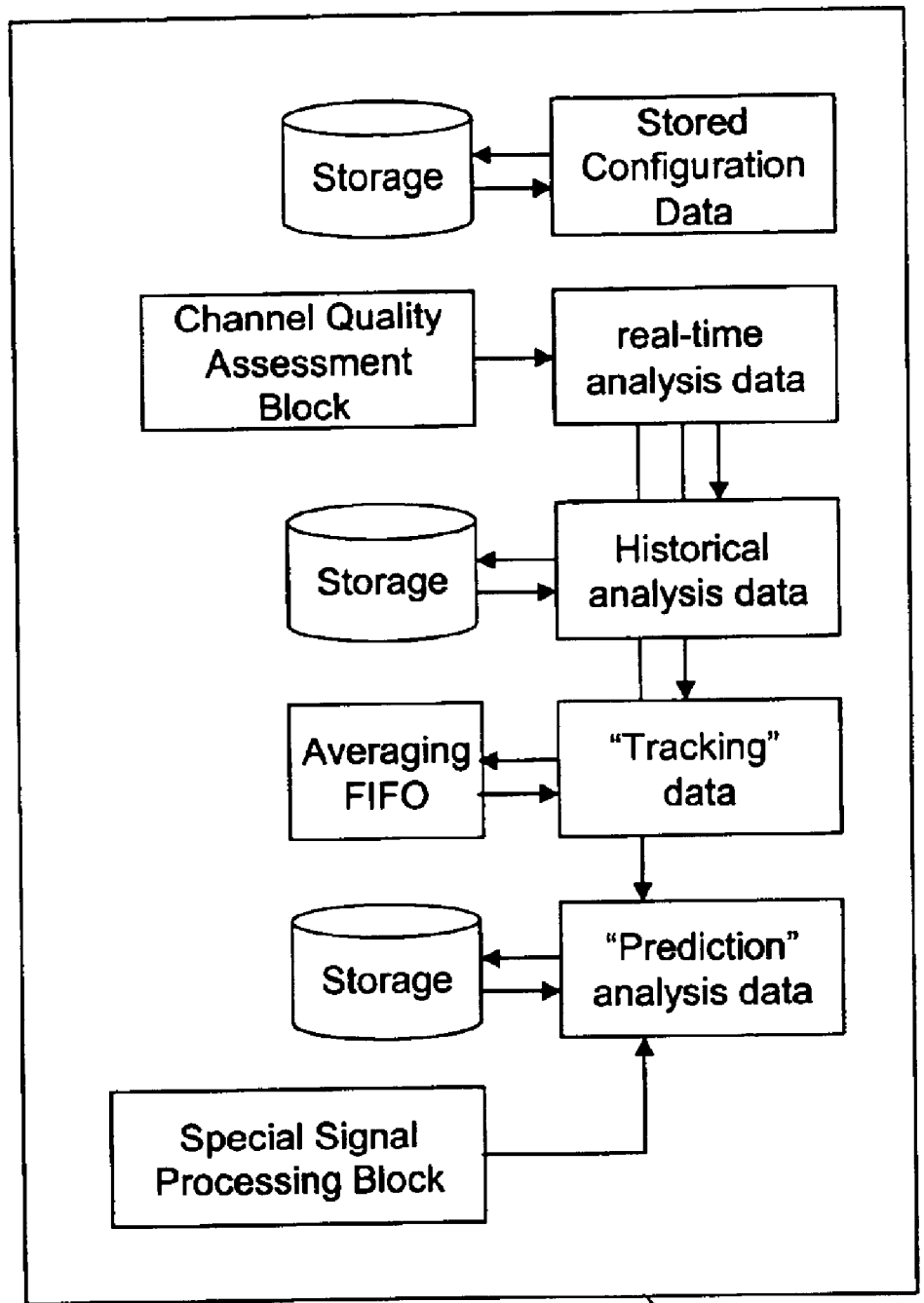
FIG. 5 is block diagram of a preferred embodiment of a configuration selector that can be included in the bit unpacking control module of the PLC transceiver of FIG. 2 in accordance with the present invention.

Referring to FIG. 4, in step 202, the packing module 80A provides that the source PLC transceiver 50A, which desires to transmit information content to the destination PLC transceiver 50D, generates PLC data signals, such as PLC maintenance signals, using techniques well known in the art and in accordance with legacy PLC system operation. The transceiver 50A transmits the PLC signals onto the network 26 for receipt by the destination PLC transceiver 50D. The unpacking module 82D analyzes the PLC signals transmitted by the transceiver 50A to obtain channel quality data for the segment of the network 26 extending between the transceivers 50A and 50D. The unpacking module 82D further includes in its memory node configuration data. The node configuration data is determined and stored at the configuration selector module 81D based on data representative of PLC signals received at the transceiver 50D and routed thereto from the FFT module 62D. The node configuration data alternatively can be preprogrammed into the module 82D using suitable, well known techniques in the art. Referring to FIG. 5, the configuration selector module 81D preferably processes received data to generate the following types of node configuration data: real time analysis data; historical analysis data; channel tracking data generated based on movement of the channel quality; and channel prediction data generated based on the learned repetitive patterns of the channel behavior that may be associated with, for example, 60 Hz currents existing on the network 26. At this point, the SLC module 82D has obtained, using well known prior art techniques, the channel quality and the node configuration data from which it can select orders of modulation for individual PLC carriers that can be generated for data payload symbols in a PLC signal frame structure to maximize data throughput rate between the transceivers 50A and 50D.

In step 204, based on the channel quality data and the node configuration data stored at the configuration module 81D, the unpacking module 82D computes a PLC signal-to-noise ratio ("SNR") transmission estimate for each individual legacy PLC carrier k that can be generated for use in PLC signal transmissions between the transceivers 50A and 50D. In a preferred embodiment, the SNR estimate computations are performed using real time or substantially real time data collected at the configuration module 81D on a per transmission basis for each distinct PLC carrier, and based on synchronization data which is normally included in legacy PLC signals and identifies start of a frame structure or the start delimiter. In an alternative preferred embodiment, the SNR estimate computations are performed based on non-real time data obtained by monitoring multiple PLC signal transmissions over predetermined periods and used by the configuration module 81D to generate historical, tracking and prediction analysis data as shown in FIG. 5. In a further preferred embodiment, the SNR estimate computations are performed based on monitoring and evaluation of seed symbols, which are included in PLC signals and used to maintain line timing in a synchronized PLC system, or framing symbols, which also can be included in PLC signals and are used to define adjustments related to line timing in a non-synchronized PLC system. The module 82D stores in its memory the SNR estimate for each available PLC carrier k in a data array SNR_est(k).

In step 206, the unpacking module 82, also based on the channel quality data and the node configuration data, determines a PLC system SNR threshold value that the actual SNR value for any available PLC carrier, which is transmitted from the transceiver 50A to the transceiver 50D and which carries a predetermined number of data bits, i.e, is modulated at a selected order of modulation, should exceed to ensure that the information content data modulated onto the PLC carrier at the selected order of modulation can be accurately and completely reconstructed at the transceiver 50D. The SNR threshold values are computed with reference to respective default SNR threshold values which have been suitably adjusted based on the node configuration data generated at the configuration selector module 81D over predetermined time intervals. The predetermined intervals preferably are longer than the time interval over which the configuration module 81D collected data for use in generating node configuration data used to compute the transmission SNR estimates in step 204. For ease of reference, a bit packing level m corresponds to the number of data bits that a PLC carrier can carry for a selected order of modulation. The module 82D stores in its memory the SNR thresholds for respective bit packing levels m in its memory as a data array SNR_threshold (m).

In step 207, the unpacking module 82D selects a previously unevaluated PLC carrier k. In step 208, the unpacking module 82D selects the highest, previously unevaluated bit packing level m. As discussed the above, the higher the bit packing level, the greater the number of data bits to be modulated onto a PLC carrier.

In step 210, the unpacking module 82D determines if SNR_est(k) exceeds SNR_threshold (m). If yes, the unpacking module 82D proceeds to step 214. If no, the unpacking module 82D in step 212 determines whether other bit packing values have not been previously evaluated. If yes, then the unpacking module 82D proceeds to step 208. If no, the unpacking module 82D proceeds to step 214.

In step 214, the unpacking module 82D stores representatively in its memory a data table entitled CarrierLoadMap which includes a column identifying the PLC carrier k currently being evaluated and a column CarrierLoadMap(k) identifying the current bit packing value m for the PLC carrier k currently being evaluated. If, for a particular PLC carrier k, the unpacking module 82D performs step 214 following the first time that step 210 is performed, then the unpacking module 82D has determined, based on the channel quality and the node configuration data, that the particular PLC carrier can be modulated at the highest bit packing level, i.e., at the highest order of modulation. At this highest order of modulation, the actual SNR for that PLC carrier is expected to be sufficiently above the SNR threshold value for the corresponding bit packing level, such that information content modulated on that PLC carrier at the selected high order of modulation is likely to be reproduced accurately and completely from the transmitted PLC carrier at the destination transceiver 50D. Alternatively, if, for a particular PLC carrier, the unpacking module 82D performs step 214 after step 210 has been performed at least two times, then the unpacking module 82D has determined, based on the channel quality and the node configuration data, that the particular PLC carrier can be modulated at a bit packing level that is at a predetermined level below the highest bit packing level ("an intermediate order of modulation"). At the particular intermediate order of modulation, the actual SNR for that PLC carrier is expected to be sufficiently above the SNR threshold value for the corresponding bit packing level, such that information content modulated on the PLC carrier at the selected intermediate order of modulation is likely to be reproduced accurately and completely from the transmitted PLC carrier at the destination transceiver 50D. Alternatively, for a particular PLC carrier, if the unpacking module 82D performs 214 after step 212, then the unpacking module 82D has determined, based on the channel quality and the node configuration data, that the particular PLC carrier cannot be modulated at any of the bit packing levels, i.e., at any of the corresponding orders of modulation. The actual SNR for that PLC carrier, modulated at any order of modulation, is below the SNR threshold value for any of the bit packing levels, such that information content modulated on the PLC carrier at any order of modulation is likely not to be reproduced accurately and completely from the transmitted PLC carrier at the destination transceiver 50D.

Following step 214, the unpacking module 82D in step 216 determines if any of the available PLC carriers have not been evaluated. If yes, the unpacking module 82D proceeds to step 207. If no, the unpacking module 82D proceeds to step 217.

When the unpacking module 82D proceeds to step 217, its memory includes a complete CarrierLoadMap table identifying available PLC carriers k and corresponding CarrierLoadMap(k) values. The CarrierLoadMap table identifies the highest orders of modulation that can be applied to available PLC carriers which can be generated for a payload symbol of a PLC frame structure in the legacy system and which should result in satisfactory reproduction of information content being transmitted. In a preferred embodiment, based on the channel quality and the node configuration data, PLC carriers likely to have a high level of noise radiation or to interfere with other services have been assigned bit packing levels of zero in the CarrierLoadMap table, thereby eliminating those PLC carriers as potential PLC data signals for a PLC transmission.

In step 217, the unpacking module 82D, using PLC system 10 operating configuration data stored therein, determines whether data block size parameters associated with processing at the FEC encoder and encrypter modules and the interleaver modules at the transceiver 50A can be adjusted, in view of the CarrierLoadMap, to further maximize data throughput rate. If yes, the unpacking module 82D generates adjusted block size parameter data for the encoder, encryper and interleaver processing.

In step 218, the unpacking module 82D routes the CarrierLoadMap and the adjusted block size parameter data, if any, to the packing module 80D and the packing module 80D transmits control and data signal to the mapper 56 for causing transmission of a PLC signal including the CarrierLoadMap and any adjusted block size parameter data, preferably in overhead data or within a PLC signal, onto the network 26 for receipt at the transceiver 50A.

Figure 6:
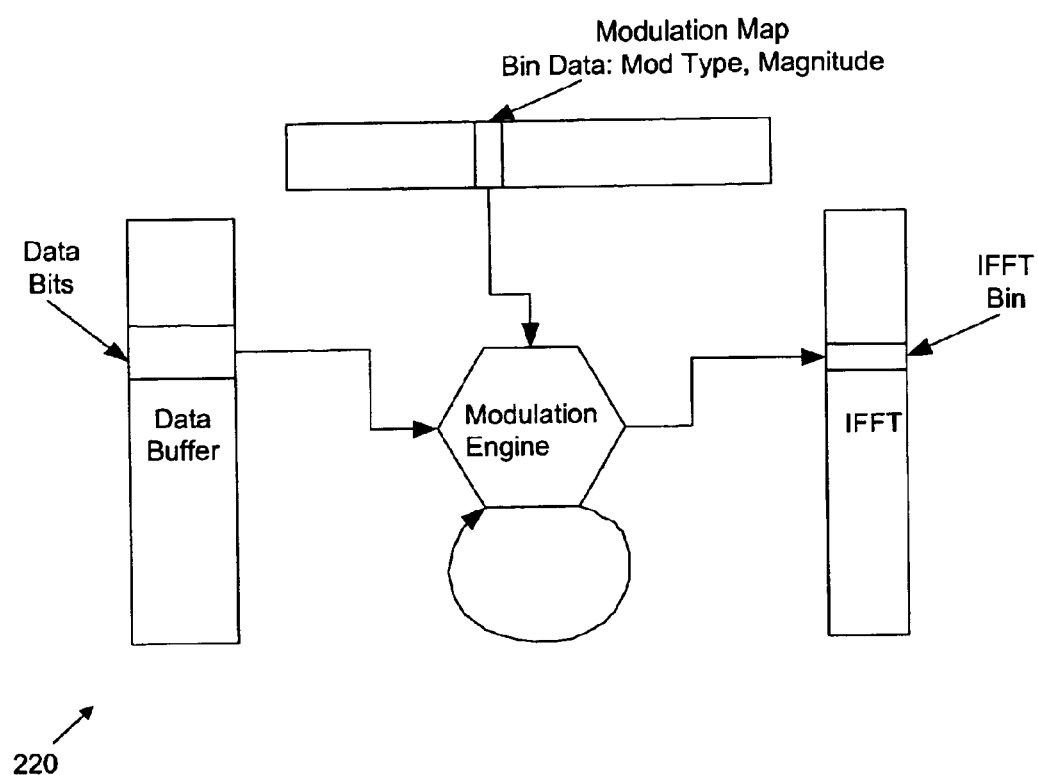
FIG. 6 is a flow diagram of mapping data bits onto PLC carriers based on a CarrierLoadMap in accordance with the present invention.

In step 220, the unpacking module 82A transmits control signals to the FFT module 62A, the demapper module 66A and the deinterleaver module 68A to provide that the CarrierLoadMap is extracted from the received PLC signal, which was transmitted by the transceiver 50D, and routed to the packing module 80A via the decoder module 70A. Further in step 220, and referring to FIG. 6, the packing module 80A transmits control modulation parameter signals to the encoder and encryptor 52, the mapper 56 and the IFFT module 58 to provide that the data bits at the interleaver module 54 are mapped onto available PLC carriers in accordance with the CarrierLoadMap and the adjusted block size parameters. The generated PLC carriers are then transmitted onto the network 26 for receipt at the transceiver 50D. For example, the CarrierLoadMap can provide that an order of modulation for a first available PLC carrier in the legacy PLC frequency spectrum results in modulation of three data bits onto the first PLC carrier; an order of modulation for a second available PLC carrier in the legacy PLC frequency spectrum results in modulation of six data bits onto the second PLC carrier; and an order of modulation for a third available PLC carrier in the legacy PLC frequency spectrum results in modulation of no data bits onto the third PLC carrier. In other words, based on the control signals, the mapper module 56A reads the number of data bits corresponding to the bit packing level contained in CarrierLoadMap(k) for a particular PLC carrier k and maps these data bits (constellation points) onto the PLC carrier (vector) k. As discussed, the bit packing level corresponds to the number of data bits to be mapped to a PLC carrier k, and, consequently, the order of modulation assigned to the PLC carrier k. For higher numbers of data bits, higher orders of modulation are used to modulate the carrier k. Further in step 220, the control signals transmitted by the packing module 80A provide that the start frame of the frame structure associated with payload symbol mapped in accordance with the CarrierLoadMap includes data indicating that the CarrierLoadMap and any adjusted block size parameter data were used to generate the PLC carriers being transmitted.

In step 222, after the transceiver 50D receives the PLC signals transmitted from the transceiver 50A, the unpacking module 82D determines from the start frame data, using conventional techniques in the art, that the PLC carrier vector was generated in accordance with the CarrierLoad-Map and any adjusted block size parameters. The unpacking module 82D generates and transmits to the modules 64D, 66D, 68D and 70D control signals including the Carrier-LoadMap and the adjusted block size data required for extracting the data bits from the respective PLC carriers based on their orders of modulation. The control signals transmitted to the equalizer module 64D provide for gain and phase adjustment for each PLC carrier, where a reference phase is obtained from the start delimiter of the frame structure that includes the payload symbols for which the PLC carriers received at the transceiver 50D were generated. In addition, the demapper module 66D provides for error correction based on frequency fading, which constitute soft decision levels for each PLC carrier. For example, the demapper module 66D uses equalization data included in the PLC signals at the IFFT module 66D, as well known in the art, to smooth the magnitude of amplitude errors over frequency, which errors are typically are a function of the PLC system channel characteristics.

Thus, in accordance with the present invention, a PLC transceiver uses node configuration data and also channel quality data specific to an individual PLC carrier of a legacy PLC system to determine whether the PLC carrier can carry a greater number of data bits relative to a legacy PLC system design requirement and yet still be likely to provide for satisfactory PLC signal transmission performance. If yes, a high order of modulation is selected for the PLC carrier, where the order of modulation is preferably sufficiently high enough to provide that the increased number of data bits can be carried on the particular PLC carrier. By independently controlling the order of modulation for individual PLC carriers that can be generated for a symbol, the data throughput rate and channel utilization efficiency can be maximized while the symbol length, such as the payload symbol, is maintained the same as in the legacy system, because the same number of available PLC carriers as defined in a legacy PLC system is maintained.

Although preferred embodiments of the present invention have been described and illustrated, it will be apparent to those skilled in the art that various modifications may be made without departing from the principles of the invention.

What is claimed is:

1. A method for transferring data on power line communication ("PLC") signals over a PLC system comprising:
   providing a PLC system for generating a plurality of distinct PLC carriers wherein the PLC carriers have frequencies within a predetermined operational PLC frequency spectrum; and
   selecting, for each of the distinct PLC carriers, an order of modulation based on channel quality data associated with the respective distinct PLC carriers and node configuration data.

2. The method of claim 1, wherein the PLC system is an orthogonal frequency division multiplexing ("OFDM") system.

3. The method of claim 1, where the distinct PLC carriers are generated within a predetermined PLC frame structure.

4. The method of claim 3, wherein the distinct PLC carriers having the selected orders of modulation are generated for symbols having predetermined lengths included in the predetermined PLC frame structure.

5. The method of claim 1, wherein the node configuration data includes at least one of stored configuration data, real time analysis data, historical analysis data, tracking data and predication analysis data.

6. The method of claim 1 further comprising:
   generating the distinct PLC carriers based on the respective selected orders of modulation and magnitude/scaling values, wherein the magnitude/scaling values are used for magnitude precompression, wherein the PLC carriers contain at least one of information content and overhead control data, wherein the overhead control data includes the magnitude/scaling values; and
   transmitting the generated PLC carriers onto the PLC system.

7. The method of claim 6 further comprising:
   receiving the generated PLC carriers;
   extracting the magnitude/scaling values; and
   performing equalization processing on the received PLC carriers using the magnitude/scaling values.

8. A method for transferring data on power line communications ("PLC") signals over a PLC system, wherein the PLC system operates in accordance with a PLC signal frame structure, the method comprising:
   obtaining at least one of channel quality and node configuration data for each of the PLC carriers;
   computing, based on at least one of the channel quality and the node configuration data, PLC transmission quality estimates for each of the PLC carriers
   determining an order of modulation for each of the PLC carriers by comparing, for each of the PLC carriers, PLC system thresholds with the transmission quality estimate, wherein the PLC system thresholds are representative of how many data bits can be packed ("bit packing level") onto a PLC carrier without substantially affecting data reproduction quality following PLC signal transmission; and
   assigning an order of modulation to each of the PLC carriers based on the results of the comparison.

9. The method of claim 8, wherein PLC carriers are generated based on a default PLC signal frame structure design including predetermined orders of modulation for assignment to the PLC carriers, wherein the order of modulation assigned to at least of one the PLC carriers exceeds or is less than all of the predetermined orders of modulation for the default design.

10. The method of claim 8 further comprising:
    transmitting from a source PLC transceiver, over the PLC system and for receipt at a destination PLC transceiver, PLC carriers generated in accordance with the frame structure;
    determining at the destination PLC transceiver, from the PLC carriers transmitted from the source PLC transceiver, whether the orders of modulation used to generate the received PLC carriers are other than a single, default mode order of modulation; and
    at the destination PLC transceiver, extracting information content data from the received PLC carriers based on the orders of modulation determination.

11. The method of claim 10 further comprising the steps:
    (a) selecting an unevaluated PLC carrier from the PLC carriers available to be generated for a symbol by the source PLC transceiver;
    (b) selecting a highest unevaluated bit packing level for the selected PLC carrier;
    (c) determining whether the transmission quality estimate for the selected PLC carrier exceeds the PLC system threshold for the selected bit packing level;
    (d) storing the selected bit packing value for the selected carrier if the transmission estimate for the selected PLC carrier exceeds the PLC system threshold for the selected bit packing level;

(e) if the transmission estimate for the selected PLC carrier does not exceed the PLC system threshold for the selected bit packing level, repeating steps (b) and (c) and, as suitable, the steps (d) or (e); and (f) proceeding to step (a) as long as unevaluated PLC carriers remain.

12. The method of claim 8, wherein the PLC system includes power and communications data distribution components operating in accordance with at least one operating mode.

13. The method of claim 8, wherein the at least one operating mode includes PLC system operation in accordance with processing capabilities at a range of processing speeds.

14. The method of claim 8, wherein the PLC carriers have frequencies within a PLC frequency spectrum extending between about 2 MHz and about 80 MHz.

15. A power line communications ("PLC") transceiver for transferring data on PLC signals over a PLC system, wherein the PLC system operates in accordance with a PLC signal frame structure, the PLC transceiver comprising:

a bit unpacking module for obtaining at least one of channel quality and node configuration data for each of the PLC carriers, wherein the unpacking module performs the following operations:
  (i) computes, based on at least one of the channel quality data and the node configuration data, PLC transmission quality estimates for each of the PLC carriers,
  (ii) determines an order of modulation for each of the PLC carriers by comparing, for each of the PLC carriers, PLC system thresholds with the transmission quality estimate, wherein the PLC system thresholds are representative of how many data bits can be packed ("bit packing level") onto a PLC carrier without substantially affecting data reproduction quality following PLC signal transmission; and
  (iii) assigns an order of modulation to each of the PLC carriers based on the results of the comparison.

16. The PLC transceiver of claim 15, wherein PLC carriers to be generated at a source PLC transceiver are generated based on a default PLC signal frame structure design including predetermined orders of modulation for assignment to the PLC carriers, wherein the order of modulation assigned to at least one PLC carriers exceeds or is less than all of the predetermined orders of modulation for the default design.

17. The PLC transceiver of claim 15, wherein the bit unpacking module determines whether orders of modulation of respective received PLC carriers generated for symbols of a PLC frame structure configured at a source PLC transceiver are other than those of a default PLC signal frame structure design requiring a single order of modulation for all PLC carriers, and wherein the bit unpacking module extracts information content data from the received PLC carriers based on the orders of modulation determination.

18. The PLC transceiver of claim 15, wherein the PLC system includes power and communications data distribution components operating in accordance with at least one operating mode.

19. The PLC transceiver of claim 15, wherein the at least one operating mode includes PLC system operation in accordance with processing capabilities at a range of processing speeds.

20. The PLC transceiver of claim 15, wherein the PLC carriers have frequencies within a PLC frequency spectrum extending between about 2 MHz and about 80 MHz.

21. The PLC transceiver of claim 17 further comprising:

a reprogrammable FEC decoder coupled to the bit unpacking module and capable of being programmed to perform PLC processing on the received PLC carriers modulated at respective selected orders of modulation.

22. The PLC transceiver of claim 17 further comprising:

a reprogrammable deinterleaver module coupled to the bit unpacking module and capable of being programmed to perform PLC signal processing on the received PLC carriers modulated at respective selected orders of modulation.

23. The PLC transceiver of claim 17 further comprising:

a reprogrammable fast fourier transform ("FFT") module coupled to the bit unpacking module and capable of being programmed to perform PLC signal processing on the received PLC carriers modulated at respective selected orders of modulation.

24. A power line communications ("PLC") transceiver for transferring data on PLC signals over a PLC system, wherein the PLC system operates in accordance with a PLC signal frame structure, the PLC transceiver comprising:

a bit packing module for assigning selected orders of modulation to the distinct PLC carriers to be generated for a symbol, wherein the orders of modulation are selected for the distinct PLC carriers based on PLC transmission quality estimates for each of the PLC carriers and PLC system thresholds, wherein the transmission estimates are determined based on evaluation of at least one of channel quality and node configuration data for each of the PLC carriers, wherein the PLC system thresholds are representative of how many data bits can be packed ("bit packing level") onto a PLC carrier without substantially affecting data reproduction quality following PLC signal transmission, and wherein the packing module performs the following operations:

(a) selecting an unevaluated PLC carrier from the PLC carriers available to be generated for a symbol;

(b) selecting a highest unevaluated bit packing level for the selected PLC carrier;

(c) determining whether the transmission quality estimate for the selected PLC carrier exceeds the PLC system threshold for the selected bit packing level;

(d) storing the selected bit packing value for the selected carrier if the transmission estimate for the selected PLC carrier exceeds the PLC system threshold for the selected bit packing level;

(e) if the transmission estimate for the selected PLC carrier does not exceed the PLC system threshold for the selected bit packing level, repeating steps (b) and (c) and, as suitable, the steps (d) or (e); and (f) proceeding to step (a) as long as unevaluated PLC carriers remain.

25. The PLC transceiver of claim 24, wherein for operation in a default mode PLC carriers are generated based on a default PLC signal frame structure design including predetermined orders of modulation for assignment to the PLC carriers, wherein the order of modulation assigned to at least of one the PLC carriers exceeds or is less than all of the predetermined orders of modulation for the default design.

26. The PLC transceiver of claim 24, wherein the PLC system includes power and communications data distribution components operating in accordance with at least one operating mode.

27. The PLC transceiver of claim 24, wherein the at least one operating mode includes PLC system operation in accordance with processing capabilities at a range of processing speeds.

28. The PLC transceiver of claim 24, wherein the PLC carriers have frequencies within a PLC frequency spectrum extending between about 2 MHz and about 80 MHz.

29. The PLC transceiver of claim 24 further comprising:
a reprogrammable FEC encoder coupled to the bit packing module and capable of being programmed to perform PLC processing for generating the distinct PLC carriers modulated at respective selected orders of modulation.

30. The PLC transceiver of claim 24 further comprising:
a reprogrammable interleaver module coupled to the bit packing module and capable of being programmed to perform PLC signal processing for generating the distinct PLC carriers modulated at respective selected orders of modulation.

31. The PLC transceiver of claim 24 further comprising:
a reprogrammable inverse fast fourier transform ("IFFT") module coupled to the bit packing module and capable of being programmed to perform PLC signal processing for generating the distinct PLC carriers modulated at respective selected orders of modulation.

* * * * *